Oct. 15, 1935.  G. F. PETERS ET AL  2,017,162
SAUSAGE CASING AND METHOD OF MAKING THE SAME
Filed May 5, 1934
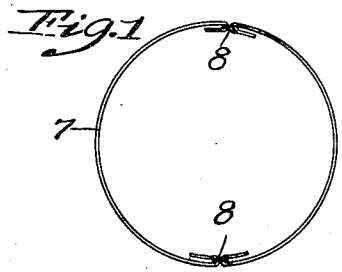
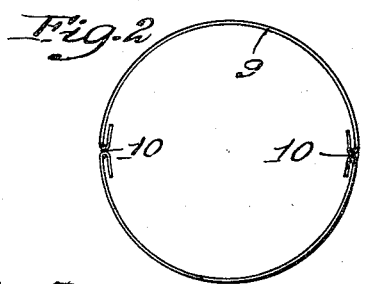
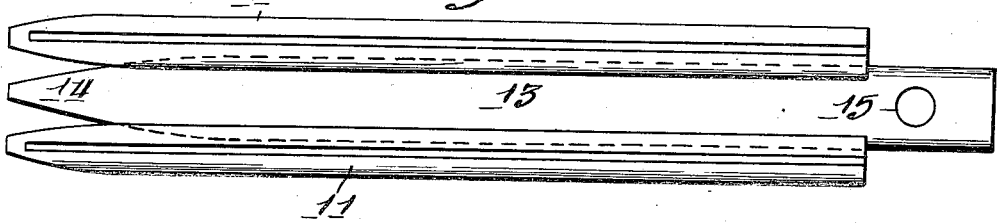
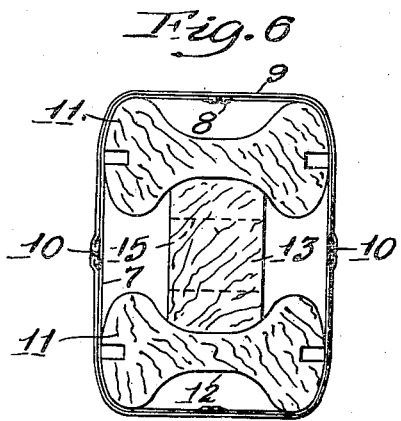
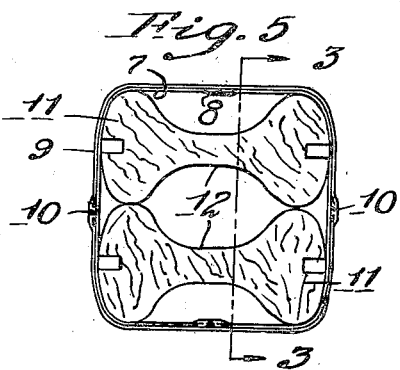
Inventors
Gustav F. Peters
Otto Reissner
By Stryker & Stryker
Attorneys Patented Oct. 15, 1935

2,017,162

UNITED STATES PATENT OFFICE 2,017,162

SAUSAGE CASING AND METHOD OF MAKING THE SAME

Gustav F. Peters and Otto Reissner, St. Paul, Minn.

Application May 5, 1934, Serial No. 724,059

5 Claims. (Cl. 17—45)

Our invention is a product and method of producing said product and relates to the manufacture of sausage casings.

In the manufacture of sausages of large diameter, the sausage meat is enclosed in a double casing formed of a so-called liner and outer covering. Because of the size of these casings both the liner and the outer covering are formed of two or more strips of skin so that a plurality of seams occurs in each casing.

As these have heretofore been made, the skins of the inner and outer casings are dried and sewed together so that the seams of the outer casing are directly over the seams in the liner and when the thus united casing is placed on drying sticks a porous line of interstices is formed along each seam. As a result, when the casings are filled with sausage meat and cooked some of the sausage meat and much of the desirable flavors are lost.

An object of our invention is to remedy these defects and to produce a casing which is an efficient closure for the sausage meat.

A further object is to improve the quality of the cooked sausage by providing a casing which will prevent the oozing of water into the sausage meat and the extrusion of the sausage meat during the process of cooking.

A further object of our invention is to produce a sausage in which the seams are staggered so that the unbroken skin of one casing covers the seams of the other.

A still further object is to provide an improved casing wherein the seams are so reinforced that firmer packing of the meat in the casing is made practical.

Our invention will be best understood by reference to the accompanying drawing in which:

Figure 1 is an end view of the liner or inner casing;

Fig. 2 is a similar view of the outer casing;

Fig. 3 is a longitudinal section taken on the line 3—3 of Fig. 5;

Fig. 4 is a side elevation of a pair of drying sticks with a spreader bar inserted between them as in stretching and drying the casing;

Fig. 5 is an end view of a pair of drying sticks in place in a casing, and

Fig. 6 is an end view with the spreader bar in place between the drying sticks.

In the drawing the numeral 7 indicates the inner casing which is formed from a plurality of strips joined together at longitudinally extending seams 8. The outer casing is indicated by the numeral 9 and has seams 10. A pair of drying sticks 11 of the usual or suitable construction are used in the process of forming each casing. These sticks have longitudinally extending grooves 12 in their opposite faces. A spreader bar 13 is arranged to be inserted between the pair of drying sticks 11, as indicated in Figs. 4 and 6, and has a pointed end 14 to facilitate insertion into the grooves 12 when forcibly spreading the sticks 11. A perforation 15 is provided in an end of the bar 13 which normally projects from the casing to facilitate hanging of the bar, sticks and casing on suitable drying racks.

In our new method of manufacturing sausage casings, the skins to be used are dried and the necessary strips to form a liner 7 of the desired diameter are sewed together along the seams 8. Likewise, the strips for the outer casing 9 are sewed along the seams 10 to form a tubular covering. Both casings are then moistened to make them elastic and a pair of drying sticks 11 are placed together as indicated in Figs. 3 and 5 and are introduced into the liner 7. Now the outer casing 9 is drawn over the liner 7 with the seams 8 of the liner staggered between the seams 10 of the outer casing 9 so that an unbroken surface of skin covers every seam in both casings. During this operation it will be understood that the skins are relatively loose so that the operation of placing the outer casing upon the liner is facilitated. The spreader bar 13 is then inserted, with its pointed end 14 foremost, into the grooves 12 between the drying sticks 11 and is forced into the position indicated in Figs. 4 and 6 to stretch the overlapping inner and outer casings. The tubular casing thus formed is dried and finally filled in the usual manner.

It will now be understood that our improved sausage casings have a number of advantages due to the construction, which prevents leakage. Thus the casing does not lose any of the meat during the cooking or smoking process and water cannot seep in through the seams, so that improved sanitation results. The process has the further advantages of insuring uniformity in size of the casings and in securing stronger casings. During the drying process, the layers of skin are baked together in such a manner that the stitches are relieved of much of the tension when the casing is filled. This makes it possible to stuff the casings more firmly, resulting in further substantial savings to the sausage maker.

Having described our invention, what we claim as new and desire to protect by Letters Patent is:

1. A sausage casing of the large, sewed type comprising a liner and an outer covering each made of a plurality of longitudinal strips sewed together, the liner being arranged within the outer covering so that an unbroken surface of the latter covers the seams of the former and an unbroken surface of the liner is directly beneath the seams of the outer covering.

2. A sausage casing of large diameter comprising a liner and an outer covering each made of a plurality of longitudinal strips sewed together, the liner being arranged within the outer covering so that an unbroken surface of the latter covers the seams of the former and an unbroken surface of the liner is directly beneath the seams of the outer covering and the liner and outer covering adhere in overlapping relation to each other to afford a substantially impervious casing.

3. The method of manufacturing large sausage casings which consists in sewing together longitudinal strips of skin to form a tubular liner and similarly sewing together a plurality of longitudinal strips to form a tubular outer covering, then inserting in the liner a form, then drawing the outer covering over the liner on said form with the seams of the liner staggered between the seams of the outer covering, then stretching said liner and outer covering to tubular form of predetermined diameter and uniting the liner and covering by drying while maintaining the same under tension in overlapping relation to each other.

4. The method of manufacturing large, sectional sausage casings which consists in sewing together longitudinal strips of skin to form a tubular liner and similarly sewing together a plurality of longitudinal strips to form a tubular outer covering, then moistening the liner and covering and inserting in the liner a pair of drying sticks, then drawing the outer covering over the liner, then inserting between said sticks within the liner a stretcher bar to expand said liner and covering and finally drying the lining and covering and removing said sticks and bar.

5. The method of manufacturing large sausage casings which consists in sewing together longitudinal strips of skin to form a tubular liner and similarly sewing together a plurality of longitudinal strips to form a tubular outer covering, then moistening the liner and covering and inserting in the liner a pair of drying sticks, then drawing the outer covering over the liner with the seams of the liner staggered between the seams of the outer covering, then inserting between said sticks within the liner a stretcher bar to expand the liner and covering in overlapping relation to each other and finaly drying said liner and covering together to form a substantially impervious tubular casing.

GUSTAV F. PETERS.
OTTO REISSNER.